Oct. 3, 1944.  J. H. BUCKNAM ET AL  2,359,352
WELDING
Original Filed Oct. 31, 1939
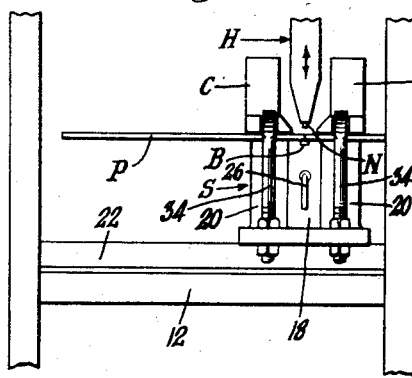
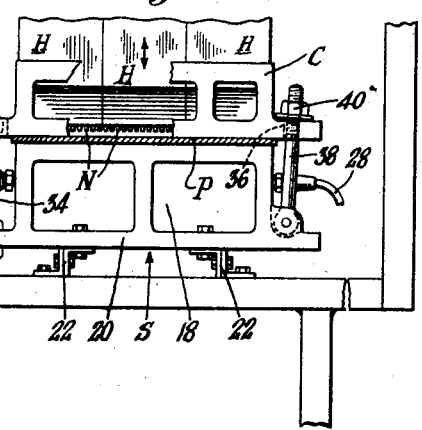
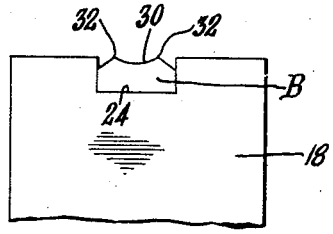
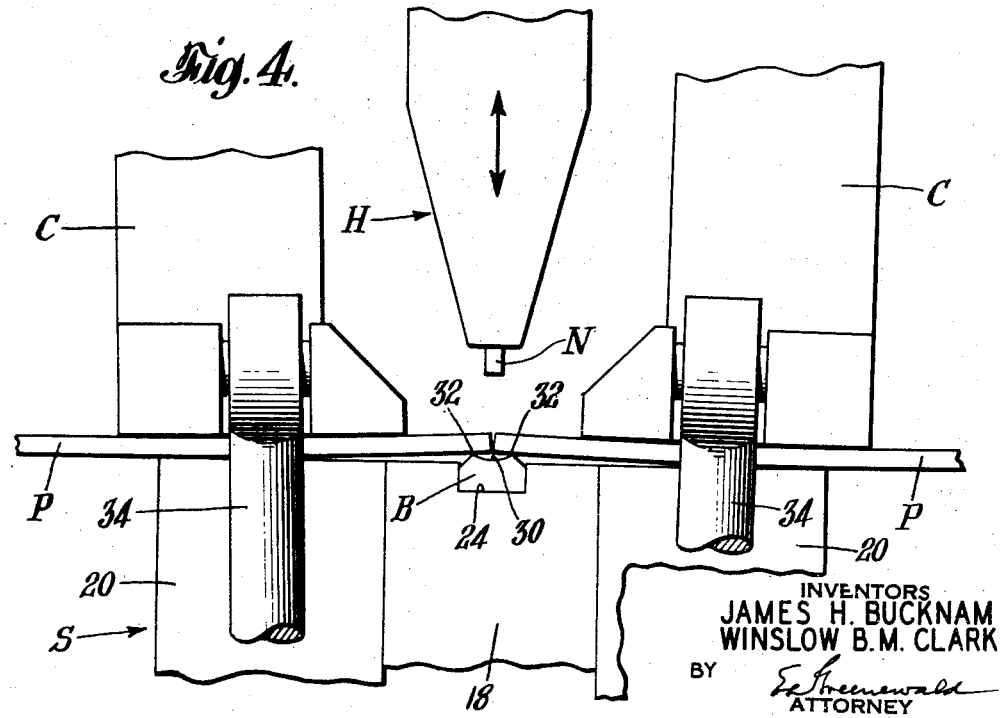
INVENTORS
JAMES H. BUCKNAM
WINSLOW B. M. CLARK
BY
ATTORNEY Patented Oct. 3, 1944

2,359,352

UNITED STATES PATENT OFFICE 2,359,352

WELDING

James H. Bucknam, Cranford, and Winslow B. M. Clark, Plainfield, N. J., assignors to The Linde Air Products Company, a corporation of Ohio Original application October 31, 1939, Serial No. 302,100. Divided and this application October 11, 1941, Serial No. 414,578

6 Claims. (Cl. 113—99)

This invention relates to welding. More particularly, the invention relates to apparatus for simultaneously welding an entire seam by the oxy-fuel gas welding process.

In many modern manufacturing processes, speed in the formation of welded joints is of paramount importance. One type of welding which is generally used for the high speed formation of welded seams or joints is the so-called electric flash welding process. In such process, the metallic members to be weld united are arranged with their adjacent edges in abutment and a heavy electric current is passed through the members and across the abutting edges. As these edges are not in perfect contact, considerable resistance to the flow of electric current thereacross is developed. This resistance causes heating and resultant fusion of the abutting edges, which thereupon become weld united.

While electric flash welding is satisfactory from a speed standpoint, the resultant welded seam or joint is not entirely satisfactory. The weld metal is in a hardened condition and the flash must be removed to provide a finished joint.

On the other hand, welded joints formed by the oxy-fuel gas welding process are characteristically of high tensile strength, ductile and soft, but the welding speed usually is of a relatively low order. In order to increase the speed of welding using the oxy-fuel gas welding process, it has been proposed to provide an apparatus comprising movable welding units simultaneously traversing different portions of the seam to be welded. While the speed of welding has been increased to a certain extent by this means, further increase in speed is necessary for practical and commercial reasons.

Attempts have heretofore been made to simultaneously weld an entire seam by the oxy-fuel gas welding process but have generally been unsuccessful due to lack of understanding of the necessary factors to be considered. Such welds, as heretofore formed, have been imperfect due to inadequate penetration, lack of proper fusion, irregular contour, and other causes.

High speed welding is of particular importance in the production of sheet steel, which material is at present being produced in great part by the continuous strip mill process. In this process, sheet steel is produced by rolling out the white hot ingot into strips varying from 20 to 100 inches in width and approximately 150 to 500 feet in length. Upon emerging from the hot finishing mills, these long hot rolled strips are wound into coils and sent to the cold finishing mills.

It is among the objects of this invention to provide apparatus for simultaneously welding an entire seam by the oxy-fuel gas welding process, in which the resultant seam is of high tensile strength and the weld metal is soft and ductile. Another object is to provide an improved work support and chill bar for use with such apparatus.

These and other objects of the invention will in part be obvious and in part become apparent from the following description and the accompanying drawing, in which:

Fig. 1 is a fragmentary side elevational view of one form of apparatus embodying the principles of the invention;

Fig. 2 is a front elevational view of the apparatus shown in Fig. 1;

Fig. 3 is an enlarged end view of the improved work support and chill bar of the invention; and Fig. 4 is an enlarged fragmentary view similar to Figure 1.

The members to be welded, which may be metallic plates or strip material, are placed with the edges to be joined in abutting or substantially abutting relation. The members are held firmly in position by suitable clamping means, and a backing or chill bar of copper or other suitable material of relatively high heat conductivity is placed beneath and in alignment with the juxtaposed edges. The backing or chill bar is formed with a longitudinally extending depressed surface portion or recess in its upper surface, and the longitudinal center line of this recess coincides with the line of intersection of the workpieces.

When the workpieces have been thus supported and fixed in position, a series of oxy-fuel gas heating flames is impinged simultaneously upon the meeting edges of the members throughout substantially the entire length of the meeting edges, and this series of flames is oscillated or reciprocated longitudinally of the edges until the metal of the juxtaposed edges fuses, commingles and drops slightly into the recess or groove in the backing or chill bar. When this occurs, the heating flames are withdrawn so that only the outer envelopes of the flames contact the work, and so maintained until the fused metal solidifies in order to maintain a reducing atmosphere adjacent the weld metal. When the welded joint has completely solidified, the heating flames are extinguished and the clamping means are released, thereby completing the operation.

In order to insure a satisfactory welded seam between the workpieces, certain critical factors such as the heating time, flame intensity, distance from the flames to the work, the amount of oscillation, distance of clamps from the adjacent edges of the workpieces, and the depth and contour of the recess in the backing or chill bar, must be taken into consideration. These several factors are dependent upon the thickness and composition of the work.

The form of apparatus illustrated in the drawing comprises a main frame upon which is mounted a work supporting means S. The plates or workpieces P are held in proper relation on the support S by means of movable substantially parallel clamps C, and a grooved backing or chill bar B is disposed on support S beneath and in longitudinal alignment with the juxtaposed edges of plates or workpieces P and substantially parallel to clamps C.

Mounted on the frame for vertical displacement and adjustment and horizontal reciprocation or oscillation is a suitable oxy-fuel gas heating unit. This heating unit may comprise one or more multi-flame heating heads H, each provided with a series of closely spaced nozzles N disposed in longitudinal alignment with the line of intersection of the workpieces P. A mixture of a combustible gas, such as acetylene, and a combustion-supporting gas, such as oxygen, may be supplied to the heads H from a blowpipe or torch through a suitable common manifold. A mechanism (not shown) is provided for oscillating or reciprocating the unit U longitudinally of the edges to be weld united. Desirably, an automatic control means (not shown) is provided to insure uniformity of operation of the apparatus in making successive welds.

Referring more specifically to the drawing, the main frame may be constructed of suitable vertical members or columns connected by cross members or braces 12. The support S, which comprises a central section 18 and lateral sections 20, is secured to the member 12 by brackets 22. The central section 18 is desirably made hollow to receive cooling fluid, and its upper surface is formed with a groove 24 of rectangular cross section to receive a combined bead-mold and backing or chill bar B, the dimensions of which are predetermined in accordance with the thickness of the workpieces P. Cooling fluid may enter the interior of section 18 through a suitable conduit 26 and may be withdrawn through another conduit 28.

The upper surfaces of the lateral sections 20 are at the same horizontal level, and the workpieces P are supported upon these sections with their opposed edges in abutting or substantially abutting relation and centrally above a concaved surface portion or groove 30 in the center of the upper surface of the bar B. This groove is so formed that knife edges 32 are formed on either side thereof, one edge engaging each workpiece. The work contacting edges 32 make only line contact with the bottom surfaces of the members or work to be welded. This line contact is of great importance in the proper functioning of the invention, as, while it is necessary to have supporting contact between the bar B and the work, it is essential that the major portion of bar B be disposed beneath and out of contact with the work. Otherwise, the chill bar B would draw the heat from the weld during the welding operation and make it difficult, if not impossible, to secure adequate heat penetration into the weld. The edges 32 engage the work along lines parallel to and spaced slightly from the abutting edges of the work. The portions of the upper surface of bar B outside the edges 32 slope downwardly away from the edges 32. The depth of the groove, which is adapted to underlie the abutting edges of the work and chill and solidify such edges when the metal thereof has fused, commingled and dropped into the groove 30, and the spacing of the contact edges is dependent upon the thickness of the workpieces as will appear more fully hereinafter.

The clamps C for holding the work firmly in correct relation are pivotally connected to the sections 20 of support S in such a manner that they may be swung both vertically and laterally away from the support and also adjusted in slight distance laterally with respect to the line to be welded. This lateral adjustment is necessary as, for optimum results, the lateral spacing of the clamps is a function of the thickness of the work.

Each clamp C is pivotally connected at one end to a bolt 34 rotatably and vertically adjustably secured to one of the sections 20. The pivotal connection of the clamp to the bolt permits limited lateral movement of the clamp along the pivot, as may be seen by reference to Fig. 1. At its opposite end, each clamp is slotted, as at 36, to receive a bolt 38, swingably connected to support S, and provided with suitable clamping means 40, which may be a washer and nut. By vertical adjustment of bolts 34 on support S and adjustment of clamping means 40, the clamps C may be urged into firm engagement with the work.

The heating unit, which is mounted for vertical adjustment and displacement and longitudinal reciprocation on the frame, includes the series of multi-frame heating heads H, of which a sufficient number are provided in tandem so that the series of nozzles N thereof are substantially coextensive with the line to be welded. The heating unit may be moved vertically into and out of operative relation with the work, and this movement is preferably automatically controlled.

As the heating nozzles N of the heads H are necessarily spaced a slight distance apart, it is necessary to reciprocate the heads longitudinally of the line to be welded a sufficient distance to insure the direct application of heat to the entire seam, i. e., a distance of the order of the spacing between the heating flames.

In the operation of the above described apparatus, certain factors must be considered before the start of the welding. Among these factors are the thickness of the work, the oxygen working pressure, the welding time, the spacing of the flame tips from the work, the lateral spacing of the clamps, and the amount of oscillation. The relative values of these factors for welding certain thickness of sheet metal are given, for the purpose of illustration only, in the following table:

| | | | | | |
|---|---|---|---|---|---|
| Metal thickness gauge No. | 18 | 16 | 14 | 12 | 10 |
| Oxygen working pressure lb. per sq. in. | 25 | 22 | 30 | 28 | 30 |
| Welding time seconds | 7½ | 7½ | 16 | 29 | 31 |
| Welding tip end to chill bar inches | ¾ | ¾ | 13/16 | 13/16 | ⅞ |
| Clamp spacing inches | ⅞ | 2 | 2 | 2 | 2 |
| Oscillatory throw inches | ¼ | ¼ | ¼ | ¼ | ¼ |

Of these various factors, the oxygen working pressure may be controlled by a suitable regulator and the welding time may be controlled manually by a stop watch or automatically by a mercury time-delay switch. The spacing of the nozzle or tip ends from the chill bar may be adjusted with the heating unit in its lower position. The clamps C may be adjusted laterally along their pivotal connection with bolts 34, and the oscillatory throw may be adjusted through the medium of an adjustable throw crank.

In operation, the plates or workpieces P are placed on the support S with their adjacent edges in substantially abutting relation to form a line to be welded. The plates are so placed that the line to be welded is centered over the groove 30 in the combined bead-mold and chill bar B and a contact edge 32 of the bar is in engagement with each plate. The groove 30 is relatively shallow, being less in depth than the plate thickness. The spacing of the contact edges 32 increases with increasing thickness of the workpieces. The clamps C are then secured in properly spaced position to hold the work in place.

Prior to the above operations, the oxygen pressure will have been adjusted and the ends of nozzles N spaced at the proper distance from the chill bar. The amount of oscillation of the heads H is dependent upon the spacing of nozzles N and the number of nozzles used is so chosen that the extreme ends of the welding line will not be heated directly. This latter is important as the heat conduction from the ends is less than that from intermediate points due to the smaller mass of metal adjacent the ends. With the welding unit in its upper position, the gas and cooling fluid control valves are opened and the heating flames lighted and adjusted to the proper proportions. In most applications, the flames are adjusted to be neutral—that is, substantially equal volumes of a combustion-supporting gas, such as oxygen, and a combustible gas, such as acetylene, are supplied to the nozzles N.

The heating unit is then lowered into operative relation to the work. At the same time the flames are reciprocated longitudinally of the line to be welded. The heating flames, by reason of the reciprocating movement, are impinged against substantially all portions of the edges of the workpieces P.

After a definite time interval, the edges of the work become fused, commingle, and drop into the groove 30 of chill bar B. At this time, the flames are withdrawn from the work so that only the outer envelopes of the flames contact the work. The flames are maintained ignited until the fused metal solidifies, thus insuring that the outer envelope gas from the flames will form a reducing atmosphere over the fused metal. On heavier work, a carburizing flame may be used at this stage to obtain a better appearing weld. When the fused metal has solidified, the flames are extinguished and the clamps are released, completing the welding operation.

For the best results, the penetration is maintained at a minimum and the zone of penetration is made as narrow as possible. The flames should not be too close to the work in order to prevent overrunning of the metal resulting in a laminated or overlapped weld. Furthermore, the edges of the workpieces should be as straight as possible to obtain good butting throughout the line to be welded. If desired, as shown in Fig. 4, the contact edges 32 of the chill bar B may extend above the level of the generally horizontal upper surface of the central section 18 so as to be slightly above the support S to peak the work at the abutting edges of the plates, which results in a more satisfactory weld, because a V is formed between the edges. Such V opens to the welding flames, insuring proper penetration of the flames in the seam. The concaved surface portion 30 of the bar B receives the fused metal and molds a continuous bead under the seam, while chilling the latter so that the bead is readily separable from the bar B.

The weld obtained by the present apparatus possesses all the good qualities of oxy-fuel gas welds, such as high tensile strength, ductility, and softness, while the speed of welding is of the order of that for electric flash welding. However, there is no hard weld deposit or flash to be removed as is true of electric flash welding. Due to the elimination of subsequent flash removal operations, the weld of the present invention can be made in less total elapsed time than an electric flash weld. Additionally, when the present apparatus is used in a strip rolling operation, no scoring of the cold rolls occurs, because of the softness and ductility of the welded joint. At the same time, the weld possesses sufficient tensile strength to withstand the severe stresses encountered in the cold rolling operation.

While one form of apparatus embodying the principles of the invention has been described somewhat in detail in order to afford a clear understanding of the principles underlying the invention, it will be obvious that numerous changes may be made in the apparatus disclosed, and certain features may be used apart from others without departing from the principles of the invention or sacrificing the advantages thereof.

This application is a division of our copending application Serial No. 302,100, filed October 31, 1939, now Patent No. 2,258,739, issued October 14, 1941.

What is claimed is:

1. Apparatus for simultaneously fusion welding an entire seam between the abutting edges of generally horizontal metal strips, said apparatus comprising a support having a flat upper surface disposed beneath the adjacent end portions of the strips to be welded, said support being provided with a transverse groove of rectangular cross section in said upper surface, which groove is located centrally between the opposite ends of said support, clamping means adjustably secured to said support at either side of and parallel with said groove, and a member formed of metal having a high coefficient of heat conductivity seated in said groove, said member being coextensive in length with said groove, the upper surface of said member consisting of only two spaced parallel work contacting knife edges adapted to make only line contact with the bottom surfaces of the strips to be welded a short distance from and parallel to the abutting edges of the strips, a concaved surface portion between said work contacting edges adapted to underlie the seam, the portions of said upper surface of said member outside of said parallel edges sloping downwardly therefrom, the arrangement being such that said edges project above the upper surface of said support and cooperate with said clamping means to peak the abutting edges of the strips and form a V between the abutting edges thereof, said concaved surface portion of said member being adapted to receive the fused metal and mold a continuous bead under said seam, while chilling the latter so that said bead is readily separable from said member.

2. Welding apparatus comprising, in combination, a frame, a support mounted on said frame for supporting adjacent end portions of metal strips with edges thereof in abutting relation to form a seam to be welded, said support comprising a central water-cooled section having a generally horizontal upper surface provided with a central groove, and lateral sections each having a generally horizontal upper surface that is level with the upper surface of said central section, the central section being disposed between said lateral sections; a clamp loosely coupled to each of said lateral sections for securing the end portions of the metal strips to be welded in proper position on said lateral sections; and a combined bead-mold and chill member removably seated in said central groove, said member having an upper surface provided with a central groove adapted to receive the fused metal and mold a bead under the weld seam, while chilling the latter so that said bead is readily separable from said member, the upper surface of said member having only a single line contact with each strip end portion above the upper surface of said support whereby said end portions are peaked with respect to the general level of the upper surfaces of the central and lateral sections of said support.

3. For use in forming fusion welds in metal strips, a support provided with a groove in its upper surface; clamping means adjustably secured to said support on either side of and parallel with said groove; and a member formed of metal having a high coefficient of heat conductivity seated in said groove, said member being substantially coextensive in length with said groove; the upper surface of said member consisting of only two spaced parallel work contacting edges projecting slightly above the upper surface of said support and adapted to make only line contact with the bottom surfaces of the strips to be welded a short distance from the abutting edges of said work, to peak the abutting edges of the work to be welded, and a concave surface portion between said work contacting edges adapted to underlie the abutting edges of said work.

4. For use with a support in forming fusion welds in metal strips, a combined bead-mold and chill bar having a bead molding groove extending longitudinally of one surface, said groove being adapted to underlie the abutting edges of the work to be welded and being bounded laterally on each side by only one work contacting knife edge projecting slightly above the upper surface of the support and adapted to make only line contact with the bottom surface of the work to be welded in spaced relation to the abutting edges of said work, whereby pressure on the work peaks abutting edges thereof to be welded.

5. For use with a support in forming fusion welds in metal strips, a combined bead-mold and chill bar having only two spaced parallel work contacting edges extending longitudinally of the top of the bar and projecting slightly above the upper surface of the support and adapted to make only line contact with the bottom surfaces of the work to be welded and to peak the abutting edges of said work, and a bead-molding groove between said work contacting edges.

6. For use in forming a fusion weld along a seam between metal strips, a combined bead-mold and chill bar consisting of an elongated bar of metal the heat conductivity of which is of the order of that of copper, said bar having its upper surface consisting of only two longitudinally extending parallel knife edges with a longitudinally extending groove between said knife edges, and portions outside said parallel knife edges sloping downwardly away therefrom; said groove being adapted to underlie the abutting edges of said strips for receiving the fused metal of the seam and forming a bead under the seam which is readily separable from said bar; said parallel knife edges being adapted to make only line contact with parallel longitudinally extending portions of the respective bottom surfaces of said strips adjacent and parallel to their abutting edges to support the same against longitudinal sagging; said downwardly sloping portions outside said parallel knife edges being constructed and arranged to clear the bottom surfaces of said strips and thereby prevent said bar from drawing heat from the strips and weld which would interfere with the chilling of the bead, while said knife edges still support said strips against longitudinal sagging.

JAMES H. BUCKNAM.
WINSLOW B. M. CLARK.